(12) United States Patent
Iida

(10) Patent No.: US 6,280,105 B1
(45) Date of Patent: Aug. 28, 2001

(54) PRINTING SYSTEM AND PRINTING CONTROL METHOD

(75) Inventor: Mitsunori Iida, Narashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/471,163

(22) Filed: Dec. 23, 1999

(30) Foreign Application Priority Data

Dec. 28, 1998 (JP) .................................................. 10-374283

(51) Int. Cl.$^7$ ................................ B41J 3/42; B41J 11/44; B41J 5/30
(52) U.S. Cl. ................................ 400/74; 400/76; 400/70; 400/61
(58) Field of Search .................................. 400/74, 76, 70, 400/61; 399/8

(56) References Cited

U.S. PATENT DOCUMENTS

| | | | |
|---|---|---|---|
| 5,710,871 | * | 1/1998 | Tadenuma et al. ................. 395/109 |
| 5,933,676 | * | 9/1999 | Ohno .................................. 399/8 |
| 5,950,036 | * | 9/1999 | Konishi ................................ 399/8 |

FOREIGN PATENT DOCUMENTS 0 825 553 * 2/1998 (EP) .

* cited by examiner

*Primary Examiner*—John S. Hilten
*Assistant Examiner*—Charles H. Nolan, Jr.
(74) *Attorney, Agent, or Firm*—Fitzpatrick, Cella, Harper & Scinto

(57) ABSTRACT

A printer controller analyzes the job language section of the print job supplied from the host computer to see if the calibration stop command set by the host computer is included in this job language section. When it judges that the calibration stop command is included in the job language section, the controller sets a flag, which indicates whether or not to allow the execution of calibration, to a content specifying the prohibition of the calibration. In the subsequent processing of print data, the flag set in this way can prevent the calibration from being executed even when a calibration request is made. As a result, in a print system comprising a host computer and a printer, it is possible to prevent unnecessary calibration from being executed and thereby deal properly with the user requirements in terms of the execution of calibration.

15 Claims, 9 Drawing Sheets

"@PJL SET CALIBRATION=STOP"
CALIBRATION STOP COMMAND

PRINTING SYSTEM AND PRINTING CONTROL METHOD

This application is based on Patent Application No. 10-374283 (1998) filed Dec. 28, 1998 in Japan, the content of which is incorporated hereinto by reference.

BACKGROUND OF THE INVENTION

1. Field of the Invention

The present invention relates to a printing system and a printing control method, and more particularly to a printing system and a method of controlling the printing system which is constituted by an information processing apparatus such as a personal computer and a printing apparatus such as a printer and performs printing associated with a calibration.

2. Description of the Related Art

A printing apparatus (also referred to simply as a printer) is widely used as an apparatus for outputting image information in an information processing system. As one such printing apparatus an electrophotographic printer using a laser beam forms a visible image by fixing a toner onto a sheet of paper. An ink jet printer of a bubble jet type, for example, ejects ink onto the sheet to form a visible image. A printing process or printing mechanism of such printers is becoming more and more complicated because of a growing trend in recent years for higher resolution and color printing required of the printer.

Such printers, due to an environmental change and wear of parts, may vary its electric or mechanical quality showing upon forming a visible image, differentiating the visible image formed. Typical examples of image variation include, for example, a change in density or a gradation of the density of a printed image or a change in a tone of a color image.

To cope with a quality degradation of a visible image in printing an image, correction processing is made for image processing functions, such as a γ correction table, that determine a relation between input and output images. This correction is generally called a calibration.

The calibration for the γ correction table, for example, is carried out as follows. Input data of a plurality of values of density or gradation levels is entered into a printer to be calibrated and a predetermined image such as a patch pattern is printed. Then, the density of the printed image is measured to obtain actual density values corresponding to the plurality of input density values (also referred to as "calibration information" herein after). Next, ratios of the actual density values to the input density values are made content of the γ correction table to update the correction values, thus completing the calibration of the γ correction table.

Known examples of the calibration executed in a print system constituted by a host device such as a personal computer (also referred to simply as a host) and a printer are as follows.

In a first example, where the host supplies print data in a form of a print job described with a page description language (PDL) to the printer, the host does not perform the calibration but instead the printer performs the calibration. More specifically, a controller of the printer accepts a calibration request from an engine of the printer at a predetermined timing and updates a correction table so that the calibration can be performed on a printer side. Then, when the printer receives the print job, the controller corrects the image data (print job) by using the updated correction table.

In a second example, where the host supplies print data in a form of a binary print job to the printer, the host is connected to the printer through a two-way communication channel and gets the calibration information from the printer, Based on the gotten calibration information, the host generates a new correction table so that the calibration is performed. The host then generates image data (print job) corrected by the new correction table. Also in this example, the calibration information is generated on the printer side. That is, in response to a request issued from the printer engine at a predetermined timing, the printer controller generates the calibration information.

However, in either of the above examples, carrying out the calibration requires the printer to perform printing and measuring operations for generating the calibration information. During the printing and measuring operations for the calibration, a usual printing operation cannot be performed. More specifically, the printer controller is so configured that, when the controller receives a request for the calibration from the printer engine at time when the controller begins to control printing based on the transferred print job from the host or while the controller is controlling printing of the print job, the controller does not begin to carry out or interrupts the usual printing and generates the calibration information.

On the other hand, when monochromatic image, particularly a document, is to be printed, the density change usually may not pose any critical problem in terms of image quality. Or a user of the printing system sometimes may want a printed result quickly without regard to the print quality. Executing the calibration, particularly generating the calibration information among others, in the case that the calibration is not absolutely needed to be performed, unnecessarily prolongs the time it takes to obtain the printed result. Further, such a printing system cannot be said to be the one that appropriately deals with the requirements of the user.

SUMMARY OF THE INVENTION

The object of the present invention is to provide a printing control method and a printing system which prevent an unnecessary calibration from being executed and which can appropriately deal with user's requirements in executing the calibration.

In the first aspect of the present invention, there is provided a printing control method for a printing system including an information processing apparatus which performs processing for printing and a printing apparatus which performing printing based on print data from the information processing apparatus and can obtain calibration information used to perform calibrate means of processing print information, the printing control method comprising the steps of:

sending from the information processing apparatus to the printing apparatus print control data denoting whether calibration is allowed to be executed or prohibited from being executed together with the print data; and in the printing apparatus, controlling the execution or stopping execution of obtaining the calibration information according to content of the print control data.

In the second aspect of the present invention, there is provided a printing control method for an information processing apparatus which controlling a printing operation of a printing apparatus which performing printing based on print data from the information processing apparatus and can obtain calibration information used to perform calibrate means of processing print information, wherein print control data denoting whether calibration is allowed to be executed or prohibited from being executed is sent to the printing apparatus together with the print data to control the execution or stopping of calibration according to content of the print control data.

In the third aspect of the present invention, there is provided a printing system including an information processing apparatus which performs processing for printing and a printing apparatus which performing printing based on print data from the information processing apparatus and can obtain calibration information used to perform calibrate means of processing print information, the system comprising:

sending means for sending from the information processing apparatus to the printing apparatus print control data denoting whether calibration is allowed to be executed or prohibited from being executed together with the print data; and control means for, in the printing apparatus, controlling the execution or stopping execution of obtaining the calibration information according to content of the print control data.

According to the configuration described above, print control data is made include data denoting that the printing apparatus is permitted or prohibited to execute the calibration when the print data and the print control data are transferred from the information processing apparatus to the printing apparatus. Then, the printing apparatus can performs controlling to prevent at least the operations for getting calibration information, such as printing and reading operation of a patch, from being executed when the print control data denotes prohibition of execution of the calibration.

The above and other objects, effects, features and advantages of the present invention will become more apparent from the following description of embodiments thereof taken in conjunction with the accompanying drawings.

DESCRIPTION OF THE PREFERRED EMBODIMENTS

Embodiments of the present invention will be described in detail by referring to the accompanying drawings.

First Embodiment

Figure 1:
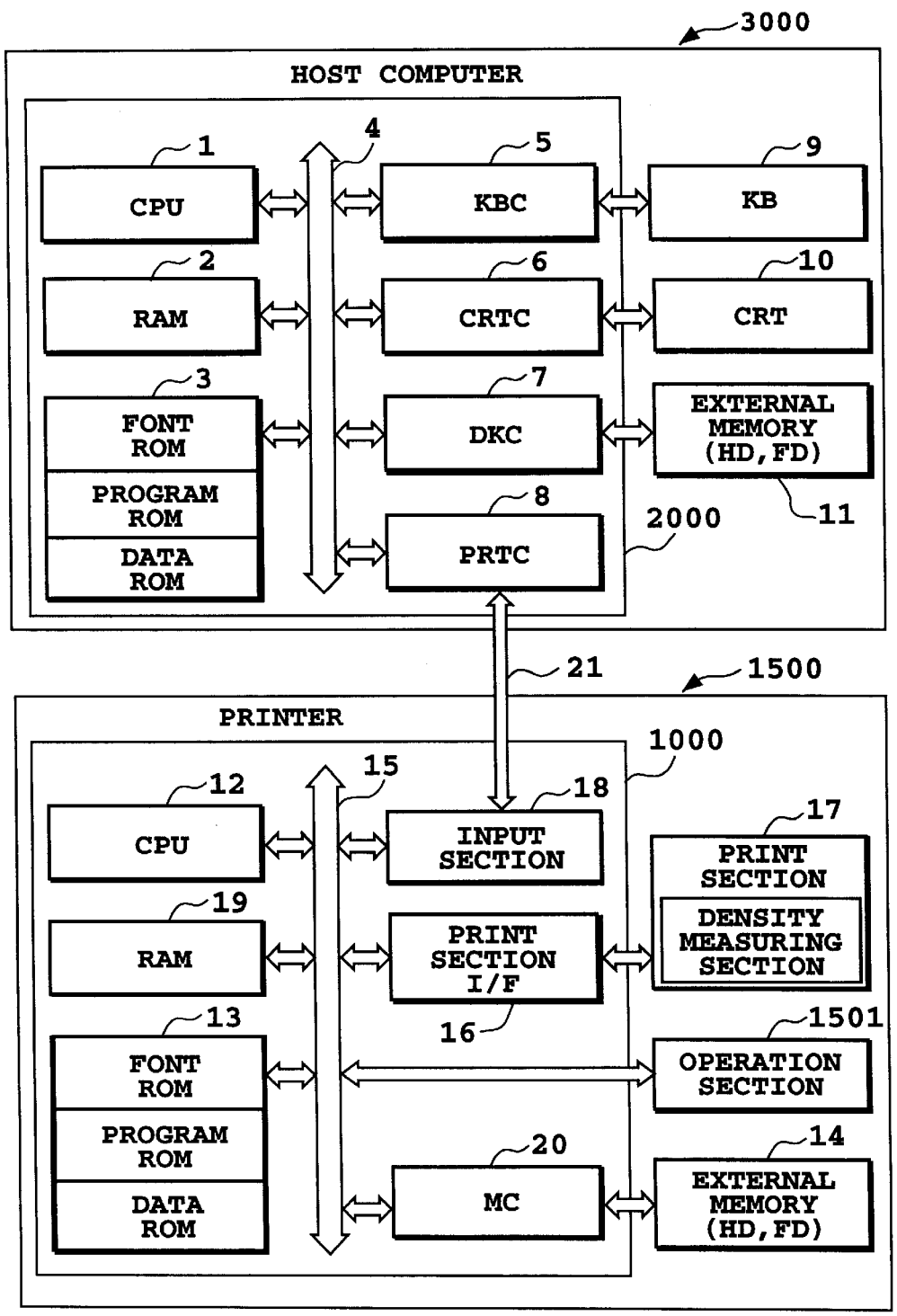
FIG. 1 is a block diagram showing a configuration of a printing system according to one embodiment of the present invention.

FIG. 1 is a block diagram showing a configuration of a printing system according to one embodiment of the present invention. It should be noted that as long as functions of this embodiment described in the following are executed, the present invention can of course be applied to a system comprising a single device or a plurality of devices and to a system in which devices are connected through a network such as LAN and WAN.

In FIG. 1, reference number 3000 represents an information processing apparatus that works as a host device in the print system. The host device of this embodiment is a form of a personal computer (hereinafter referred to as a host computer or simply as a host) and executes a control associated with printing. More specifically, an external memory 11, as described later, stores as files software programs including an application such as word processing program, a graphic engine, a printer driver and a system spooler. CPU 1, according to the operating system program (OS) stored in a program ROM of ROM 3, executes the above programs to process a document containing figures, images, characters and tables (including spread sheet calculations) and to perform a print control on the result of the document processing.

In the font ROM of ROM 3 or in the external memory 11 is stored font data used for the document processing. In the data ROM of ROM 3 or in the external memory 11 is stored a variety of data used for the document processing. RAM 2 works as a main memory and a work area when the CPU 1 executes the control stated above. Keyboard controller (KBC) 5 controls inputs from a keyboard (KB) 9 and a pointing device not shown and supplies the input data to the CPU 1. CRT controller (CRTC) 6 controls a display by a CRT displaying device (CRT) 10 according to control data from the CPU 1. Disk controller (DKC) 7 controls accesses to the external memory 11, such as hard disk (HD) or floppy disk (FD), that stores a boot program, various applications, font data, user files, edit files and a printer driver that is a program generating printer control commands.

Printer controller (PRTC) 8 is connected to a printer 1500 through a bidirectional interface 21 of a predetermined type and can perform a print control of the printer 1500 as described later.

Further, the CPU 1 rasterizes outline fonts on a display information RAM defined on the RAM 2 to enable a WYSIWYG using the CRT 10. The CPU 1 also opens various registered windows according to commands specified by a mouse cursor (not shown) on the CRT 10 and executes data processing according to the respective windows. This window configuration allows the user, on carrying out a printing operation, to open a window for setting printing operation to make appropriate settings to the printer driver regarding the print processing including setting of a printer for use and selection of a print mode.

In the printer 1500, CPU 12, according to the control program stored in a program ROM of ROM 13 or in an external memory 14, outputs an image signal as print data to a printing unit (printer engine) 17 connected to a system bus 15 to control the printing operation. A font ROM of ROM 13 stores font data used to generate the print data further, a data ROM of ROM 13 may is used to store information used by the host computer when the external memory 14 is not mounted to the printer.

The CPU 12 can communicate with the host computer via an input unit 18 and therefore receive print jobs and print control information from the host computer and send information of the printer to the host computer. RAM 19 works as a main memory and a work area for the CPU 12 when the CPU 12 executes control. Further, the RAM 19 can be expanded in memory capacity by means of an option RAM connected to an expansion port not shown. More over, the RAM 19 is also used as a print information developed area, an environmental data storage area and an NVRAM. Accesses to the external memory 14, such as hard disk (HD), floppy disk (FD) and IC card, are controlled by a memory controller (MC) 20. An external memory 14 in this embodiment is optionally connected for use and stores font data, emulation program, form data, etc. An operation panel 1501 is provided with switches and LED indicators for operating the printer. More than one external memory 14 may be used and an arrangement may be made to allow additional use of an option font card in addition to built-in fonts and of external memories storing programs that interpret different printer control languages. The NVRAM may also be used to store printer mode setting information entered from the operation panel 1501.

A print section 17 of this embodiment is of electrophotographic type using a laser beam and includes a laser beam emitting section, a photosensitive drum, a developing section that imparts color toners to latent images formed by the laser beam on the photosensitive drum, and a transfer section for transferring the toner images on the photosensitive drum onto paper. The print section 17 also has a density measuring section for obtaining actual density values by the printer which are used as calibration information. The density measuring section has a sensor for measuring the density on a predetermined patch, which is of a toner image formed on the photosensitive drum. More specifically, generating the calibration information by using the density measuring section involves: first forming a latent patch image on the photosensitive drum for each of a predetermined number of density levels of each toner color, yellow, magenta, cyan and black, by the laser beam system; applying respective toners to these latent images to form toner images; and reading the patch toner images by the sensor to obtain actual density values for individual toner colors, i.e., the calibration information.

This embodiment employs the first form of calibration execution described above. That is, the calibration information is automatically generated at a timing determined individually by the printer and, based on the calibration information generated, the correction table is updated on the printer side. In this embodiment, the timings at which the calibration information is generated are when the printer power is turned on, when a predetermined number of sheet, for example 50 or 100 sheets, have been printed, and when a toner is replaced. The latest calibration information generated at these timings is temporarily stored in the RAM 19. At the same timing that this calibration information is generated, the content of the correction table is updated based on the calibration information that is stored temporarily as described above. Then, when the host sends a print job to the printer, the print data is corrected by thus calibrated correction table and the printing operation is executed. It should be noted that the timing at which the calibration is executed does not need to be the same as the timing at which the calibration information is generated, as described above. The calibration may be executed, for example, when a predetermined status change of the printer is detected. The predetermined status change may include one in which the accumulated time of use of the printer exceeds a predetermined time and one in which a change in the calibration information for a predetermined number of sheets exceeds a predetermined value.

Figure 2:
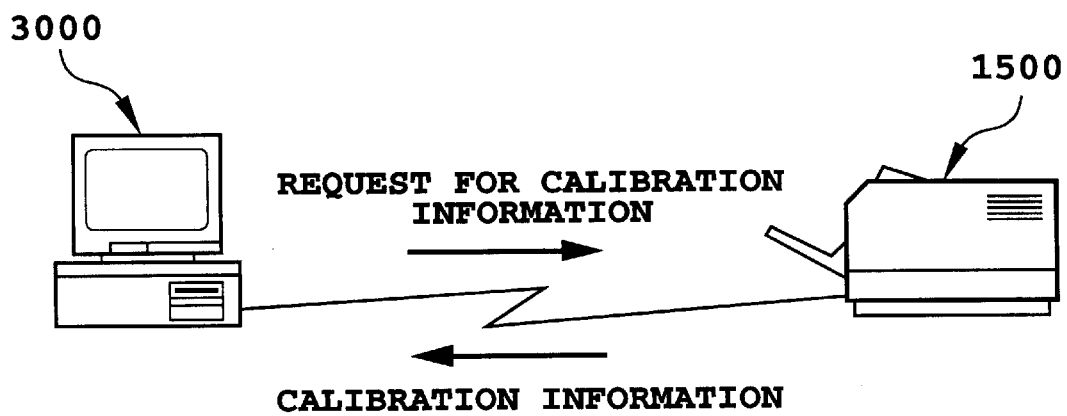
FIG. 2 is a conceptual diagram showing a two-way communication between a host and a printer in the printing system according to another embodiment of the present invention.

In the case that the printing system adopts the second form of calibration execution described above, the host 3000, when it generates a print job, issues a request to the printer 1500 for the calibration information, as shown in FIG. 2. In response to the request, the printer presents to the host the calibration information that was stored in the RAM 19 at a predetermined timing or each time a predetermined status change occurred. Then, based on this calibration information, the host 3000 generates correction values and updates the content of the correction table.

Figures 3, 4:
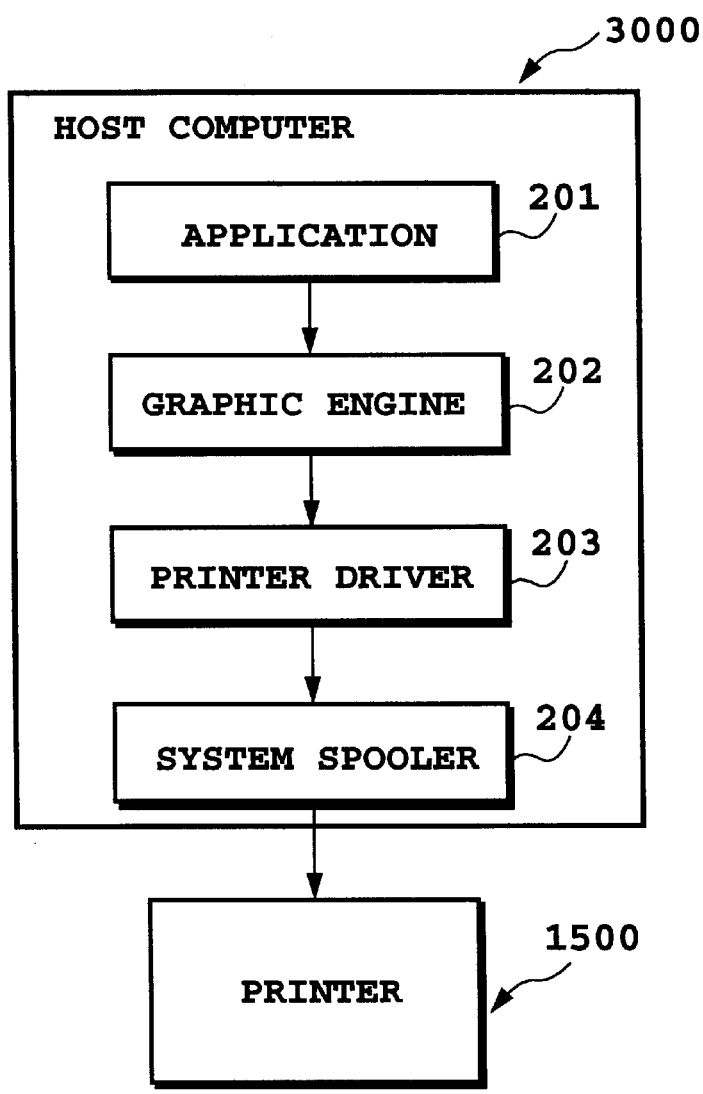
FIG. 3 is a block diagram showing a configuration of programs associated with the generation of print data in the printing system.
FIG. 4 is a calibration stop command according to the embodiment of the present invention.

FIG. 3 shows print processing that can be performed by the printing system of this embodiment that has the printer connected to the host directly or through a network. An application 201, a graphic engine 202, a printer driver 203 and a system spooler 204 shown in FIG. 3 are stored as files in the external memory 11 and constitute program modules that are loaded into the RAM 2 for execution by the OS or associated modules that make use of these program modules. The application 201 and printer driver 203 may also be added to an FD of the external memory 11, a CD-ROM not shown, or the HD in the external memory 11 through a network not shown. The application 201 stored in the external memory 11 is loaded into the RAM 2 for execution of it. When the information processed by this application 201 is to be printed by the printer 1500, the graphic engine 202 that is already loaded into the RAM 2 and ready to be executed is used for printing (drawing). More specifically, the graphic engine 202 is provided for each printer and uses the printer driver 203 similarly loaded from the external memory 11 into the RAM 2 to convert the information output from the application 210 into a control command for controlling the printing operation of the printer 1500. The converted printer control command is output through an interface 21 to the printer 1500 by the system spooler 204 loaded into the RAM 2 by the OS. In this embodiment, the print job supplied from the host computer to the printer consists of a job language section comprising control commands on the print job and an image drawing command section comprising image drawing commands.

In the first embodiment of this invention, it is an object to prevent unnecessary calibrations from being executed and therefore the throughput of the print processing from degrading. Hence, in this embodiment a control command for this purpose is included in the print job. FIG. 4 is a diagram showing an example of the control command to prohibit the calibration from being executed during the printing operation. When this command (hereinafter called a calibration stop command) is included in the job language section, the controller of the printer performs control so that even when a calibration request is made by the engine, for example, when the number of printed sheets exceeds 100, the calibration is not executed until the processing based on the subsequent image drawing command section is completed.

Figure 5:
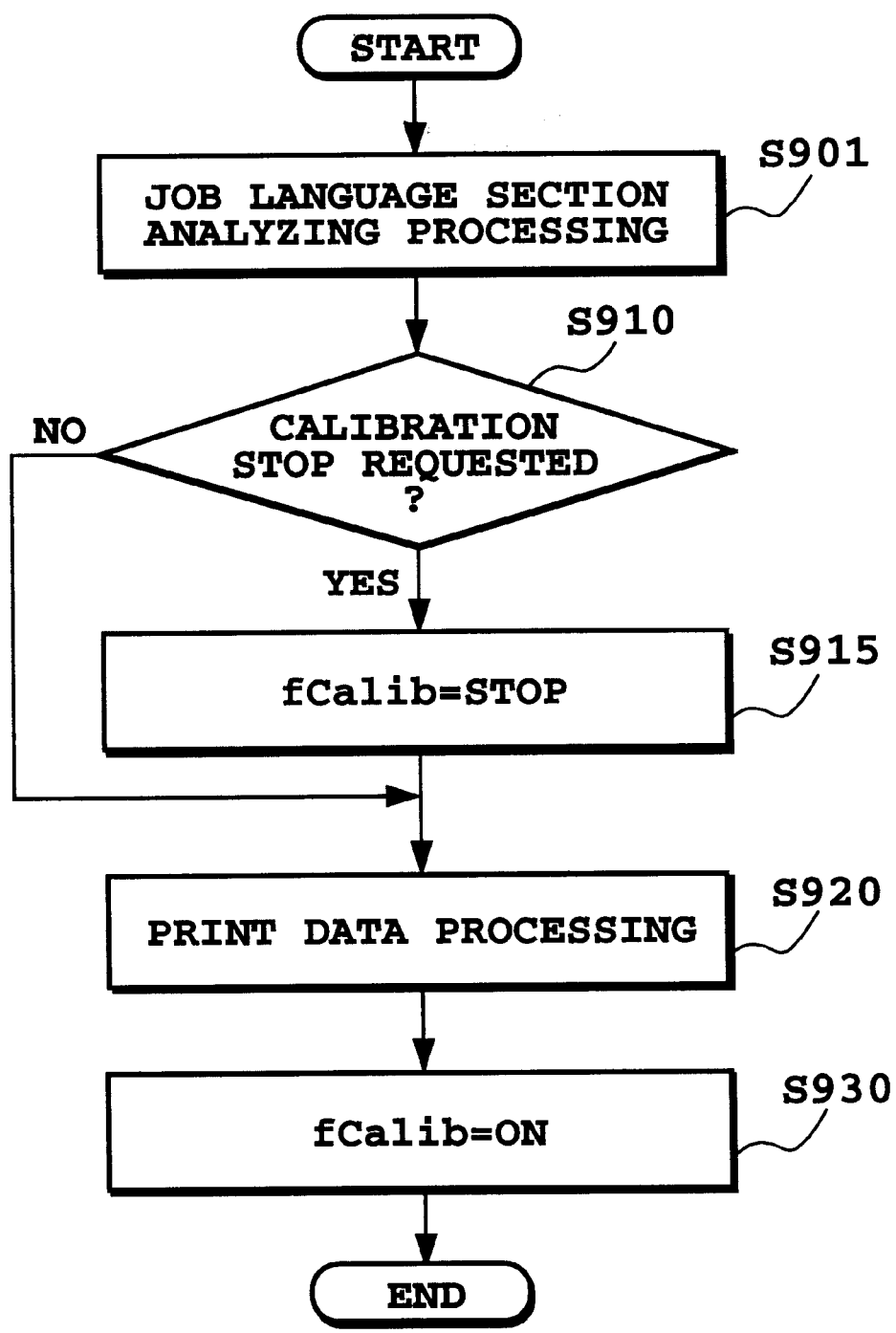
FIG. 5 is a flow chart showing print processing performed by a printer controller of the embodiment of the present invention when the controller receives a calibration stop command.

FIG. 5 is a flow chart showing the processing for a print job as performed by the printer 1500.

Upon reception of the print job, the processing is started to perform analysis and processing of the job language section, at first (step S901) and, at step S910, checks if the calibration stop command shown in FIG. 4 is included or not in the print job. When the calibration stop command is included in the job, a flag fCalib representing as to whether or not to permit the calibration is set to STOP which denotes that the calibration is prohibited from being executed (step S915). Then the processing proceeds to step S920. The initial value of the flag fCalib is ON which denotes that the calibration is permitted to be executed. At step S920, the printing is performed based on the image drawing command section of the print job. Then, at step S930 the flag fCalib is set to ON, ending the execution of the print job.

Figure 6:
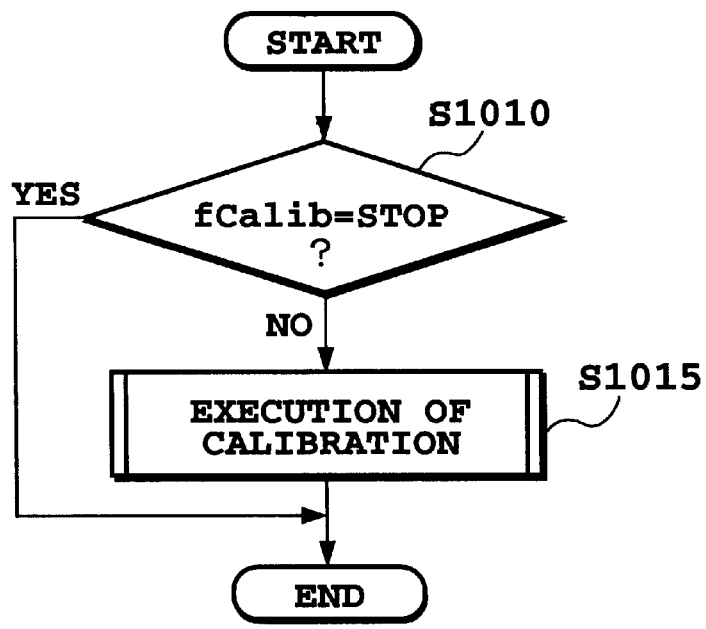
FIG. 6 is a flow chart showing calibration execution processing performed by the printer controller when the controller receives a calibration request in the processing shown in FIG. 5.

Next, the processing performed by the printer controller at the time when, during the execution of a print job, the number of printed sheets has reached 100 causing a calibration request to be issued from the printer engine, will be explained by referring to the flow chart of FIG. 6.

When a calibration request is issued from the printer engine, this processing is started by, for example, an interrupt to check the status of the flag fCalib, at first (step S1010). When the status of the flag is STOP, the processing is ended by ignoring the calibration request. When the flag status is not STOP, the calibration is executed (step S1015).

Figure 7:
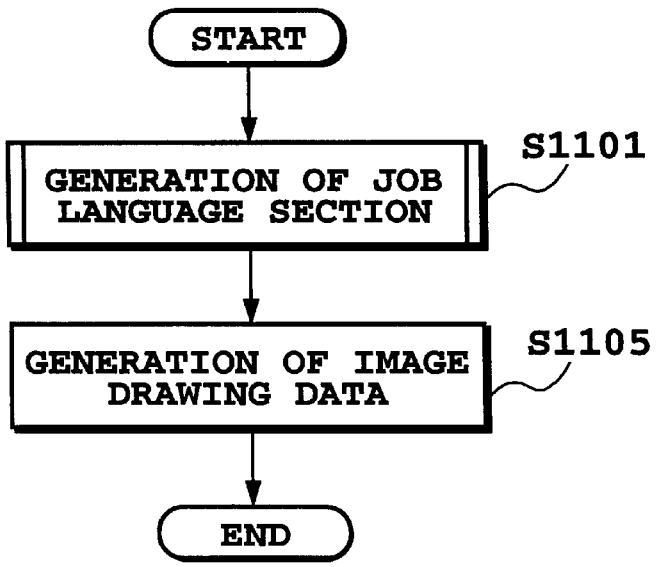
FIG. 7 is a flow chart showing print job generation processing performed by the host which corresponds to the processing of FIGS. 5 and 6 performed in the printer.
Figure 8:
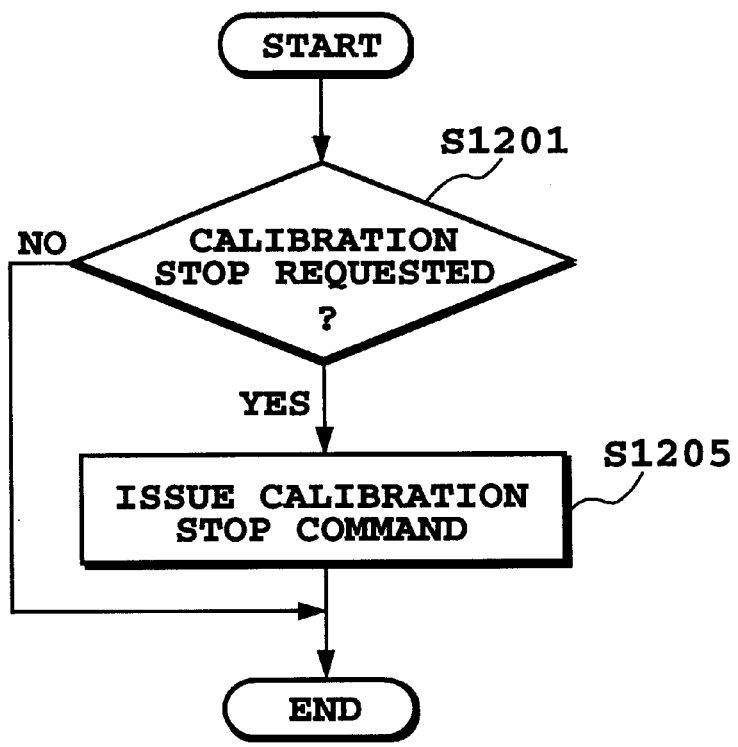
FIG. 8 is a flow chart showing calibration stop command issue processing performed together with the processing of FIG. 7.

FIGS. 7 and 8 are flow charts showing print job generation processing, performed by the host computer 3000, which includes the setting as to whether or not to issue the calibration stop command.

Figure 9:
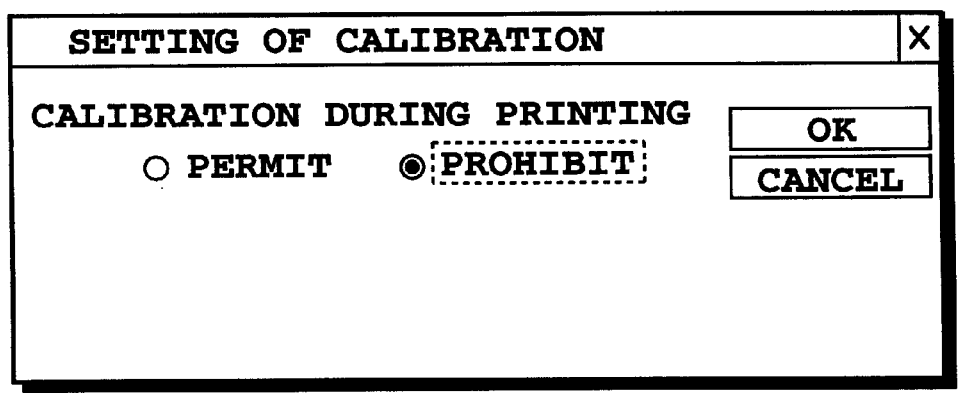
FIG. 9 is a diagram showing a user interface according to the embodiment of the present invention for setting permission or inhibition of execution of the calibration during a printing operation.

Prior to execution of printing, the user makes settings regarding the printing operation as well as regarding whether the calibration can be executed or not. FIG. 9 shows an example of a user interface that is displayed on the CRT 10 for the user to make a setting as to whether the calibration during printing operation is allowed or not. When through this user interface the user makes a setting in a way that prohibits the calibration to be executed, the calibration stop command will be included in the print job as described in the following.

When the user specifies execution of printing by means of the application 201, the printer driver 203 generates a print job. As shown in FIG. 7, the printer driver 203 first generates a job language section (step S1101) and then image drawing data (step S1105). This print job is sent to the printer 1500 where it is executed.

FIG. 8 is a flow chart showing, as part of the job language section generation processing of step S1101 of FIG. 7, processing of either issuing or not issuing the calibration stop command. As shown in the figure, when it is judged that the user has made a setting through the interface of FIG. 9 to prohibit the execution of the calibration during printing operation (step S1201), the calibration stop command is issued (step S1205). When the user makes a setting in a way that causes the calibration to be executed, the calibration stop command is not issued (step S1201).

According to the processing described above, when the user makes a setting in a way that prohibits the calibration during printing operation, the printing is carried out without executing the calibration even when a calibration request is issued from the printer engine. With the above configuration, when, for example, a user wants a specified number of sheets printed quickly, it is possible to prohibit the calibration to be executed in response to the user request, thus realizing a print system that appropriately conforms to the user requirements.

In this embodiment, even when the user makes a setting to prohibit the calibration to be executed, once the print job of that setting of prohibition is completed, the flag representing whether the calibration can be executed or not is automatically set to ON (step S930 in FIG. 5). Hence, unless a user who is going to use the same printer for the next print job makes calibration inhibition setting, the calibration is executed in the next print job. More specifically, because the processing shown in FIG. 6 is started by an interrupt that is invoked by the calibration request from the printer engine and because the printer engine in this embodiment maintains this interrupt request until the calibration is executed, the processing of FIG. 6 is initiated without fail. In this case, unless the flag is set to prohibit the calibration to be execution, the calibration is executed. Therefore, in this embodiment, the calibration is likely to be executed basically when one print job is finished, as explained in FIG. 13.

In other words, when the calibration is prohibited in successive print jobs in a printer, the printer continues to remain in the state in which the calibration is not executed even when the calibration request has been issued.

Hence, it may be possible to have the printer controller notify the host that a calibration request has been issued from the printer engine, so that the host can display on the user interface display of FIG. 9 the fact that there is the calibration request.

In making a setting as to whether or not to allow the execution of calibration, the user can therefore take into account the content to be printed and the fact that the calibration request has been issued from the printer engine. As a result, the print system can cope more properly with a user request.

In the case that the printing system of this embodiment is constructed in a network environment particularly comprising a plurality of clients, a network administrator may control the execution of the calibration. For example, an arrangement may be made to ensure that whenever a print job that is set with a calibration inhibition has been completed, the calibration is executed whatever the user next setting on the subsequent calibration execution. Alternatively, a number of times that the calibration has been avoided by the user may be counted and when the count reaches a predetermined value, the calibration may be executed.

Second Embodiment

Figure 10:
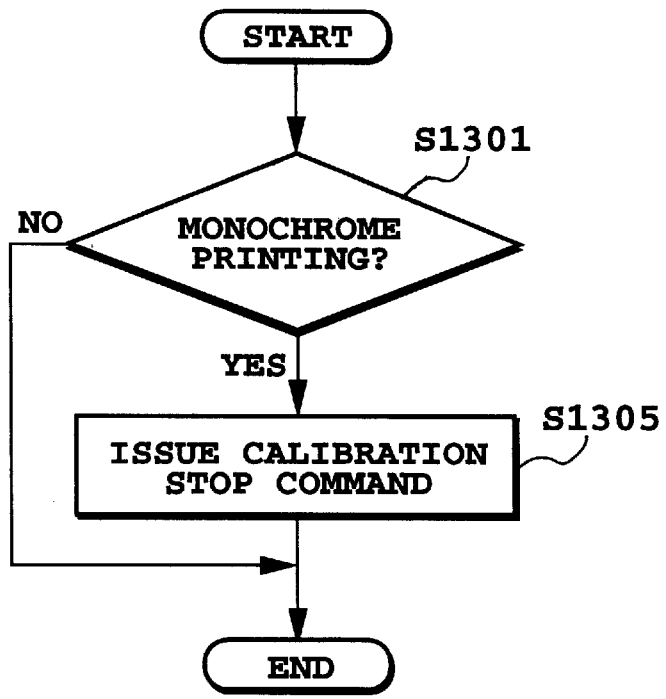
FIG. 10 is a flow chart showing calibration stop command issue processing according to another embodiment of the present invention.

This embodiment executes the processing shown in FIG. 10 instead of the processing shown in FIG. 8 of the first embodiment.

Figure 11:
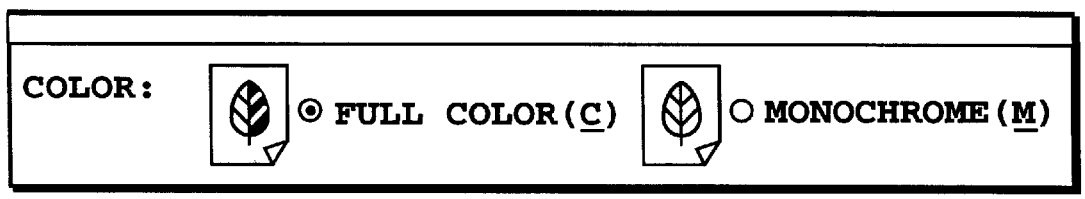
FIG. 11 is a diagram showing a user interface for setting monochromatic printing or color printing according to another embodiment of the present invention.

In this embodiment, the user makes a color/monochrome setting on a document to be printed prior to performing the printing. FIG. 11 shows an example of a user interface for the color/monochrome setting.

As shown in FIG. 10, when it is judged that the user has made a setting on the user interface of FIG. 11 to produce a monochromatic printout (step S1301), the calibration stop command is issued (step S1305). When a setting is made to produce a color printout, the calibration stop command is not issued (step S1301).

According to the above processing, when the user opts for the monochromatic printing in the color/monochrome setting, it is decided that print quality does not matter much, automatically prohibiting the calibration from being executed during the printing operation. This prevents a reduction in the throughput of printing, which would otherwise be caused by the execution of calibration.

Third Embodiment

Figure 12:
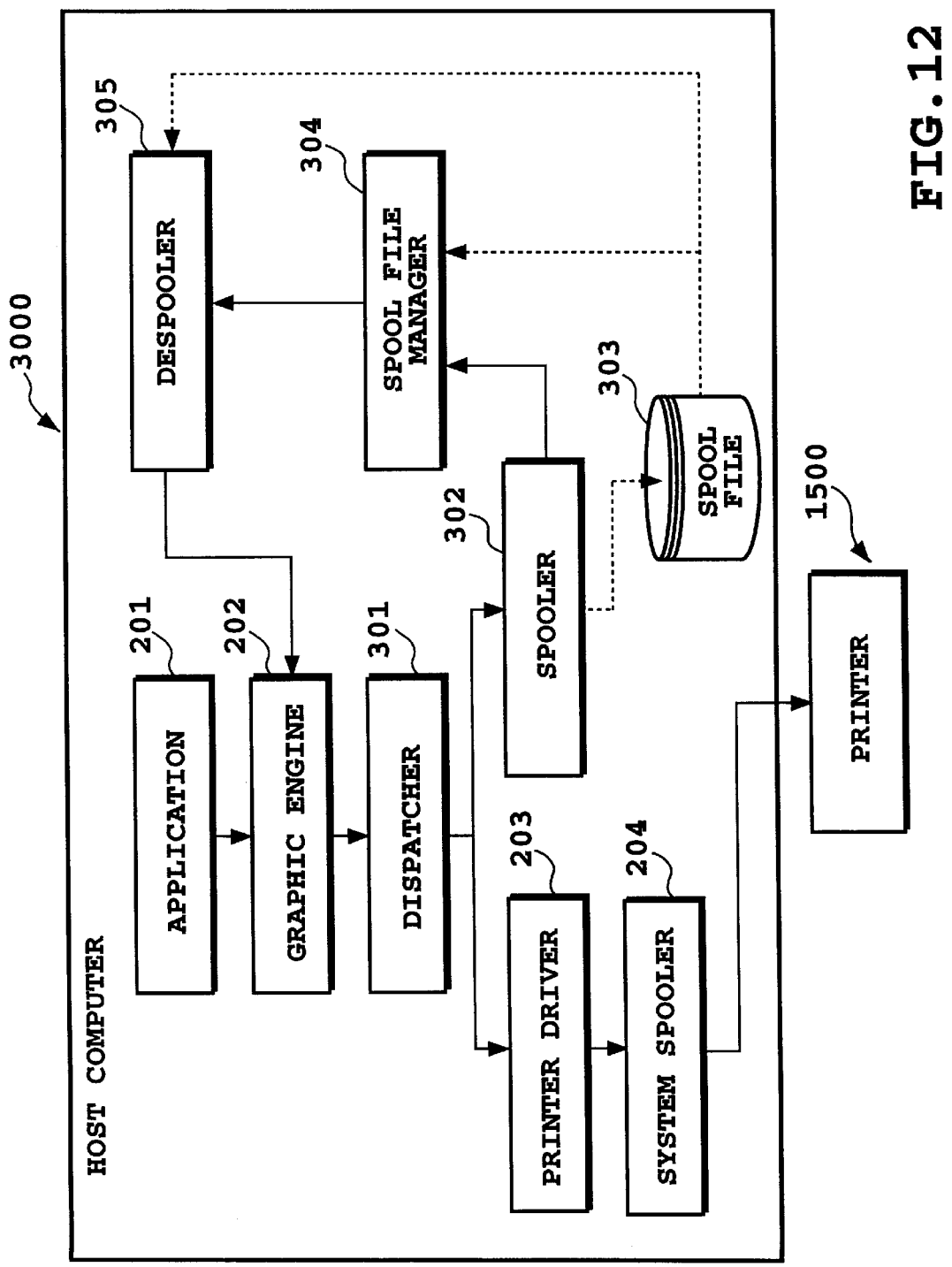
FIG. 12 is a block diagram showing a configuration of programs associated with print data generation for generating intermediate codes according to still another embodiment of the present invention.

Unlike the printing system of the first embodiment comprising a host computer containing programs as shown in FIG. 3 and a printer, the printing system of this embodiment temporarily spools the print data from the application by using intermediate code data as shown in FIG. 12.

FIG. 12 represents an expanded version of configuration shown in FIG. 3. This configuration is characterized in that when a print command is sent from the graphic engine 202 to the printer driver 203, a spool file 303 consisting of intermediate codes is generated temporarily. In the configuration of the first embodiment shown in FIG. 3, the application 201 is freed from the print processing only when the printer driver 203 has converted all print commands from the graphic engine 202 into printer control commands. On the other hand, in the system of this embodiment shown in FIG. 12, the application is freed when the graphic engine 202 finishes outputting all print commands to the spool file 303. Usually, the latter can be completed in a shorter time.

In the system of this embodiment, the content of the spool file 303 can be checked to determine whether there is any print data specified to be printed in color. When a document is found to contain only monochromatic data, the document can be handled as a monochromatic print document and printed as such. The decision on the presence or absence of print data specified with color printing is made by the spooler 302 which, when spooling into the spool file 303 the image drawing data transferred from the graphic engine 202 to the dispatcher 301, checks whether the image drawing data is a color object or not. As a result, the information on whether individual pages have a color object or not is held in the spool file 303 as page-based information. After the spooling is finished, the spool file manager 304 calls up a despooler 305, which then references the page-based information in the spool file 303 and draws a page containing a color object as a color document and a page not containing a color object as a monochromatic document.

When the print data is to be processed, the necessary setting is usually made on a window provided by the printer driver 203 and the content of the setting is saved on the RAM 2 or external memory 11 by the printer driver 203.

In the expanded processing system shown in FIG. 12, a print command from the graphic engine 202 is received by the dispatcher 301. When the print command which the dispatcher 301 has received from the graphic engine 202 is one issued from the application 201 to the graphic engine 202, the dispatcher 301 loads the spooler 302 stored in the external memory 11 onto 302 instead of the printer driver 203 the RAM 2 and sends the print command to the spooler The spooler 302 converts the received print command into the intermediate code and writes it into the spool file 303. The spooler 302 also gets from the printer driver 203 the content of print data processing which is set in the printer driver 203 and stores it in the spool file 303. While this embodiment generates the spool file 303 as a file on the external memory 11, it may be generated on the RAM 2. Further, the spooler 302 loads the spool file manager 304 stored in the external memory 11 onto the RAM 2 and informs the status of generation of the spool file 303 to the spool file manager 304. Then, the spool file manager 304 makes a judgement on whether printing can be performed according to the content of print data processing stored in the spool file 303. When the spool file manager 304 judges that the printing can be performed using the graphic engine 202, it loads the despooler 305 stored in the external memory 11 onto the RAM 2 and directs the despooler 305 to process the intermediate codes contained in the spool file 303.

In response to this instruction, the despooler 305 processes the intermediate codes contained in the spool file 303 according to the processing content contained in the spool file 303 and then outputs the processed print data to the dispatcher 301, again through the graphic engine 202.

When on the other hand the print command which the dispatcher 301 received from the graphic engine 202 is one issued from the despooler 305 to the graphic engine 202, the dispatcher 301 sends the print command to the printer driver 203, not the spooler 302.

The printer driver 203 generates a printer control command according to the print command or the data thus supplied, and outputs the printer control command to the printer 1500.

In the expanded system described above, the content of the print data stored in the spool file 303 is checked and the printer driver handles the print data as monochromatic print data when it contains no color data, thus issuing the calibration stop command and outputting the print job containing the calibration stop command, as shown in FIG. 10. This process is done without requiring the user to be consciously aware of the content of the print data.

Figure 13:
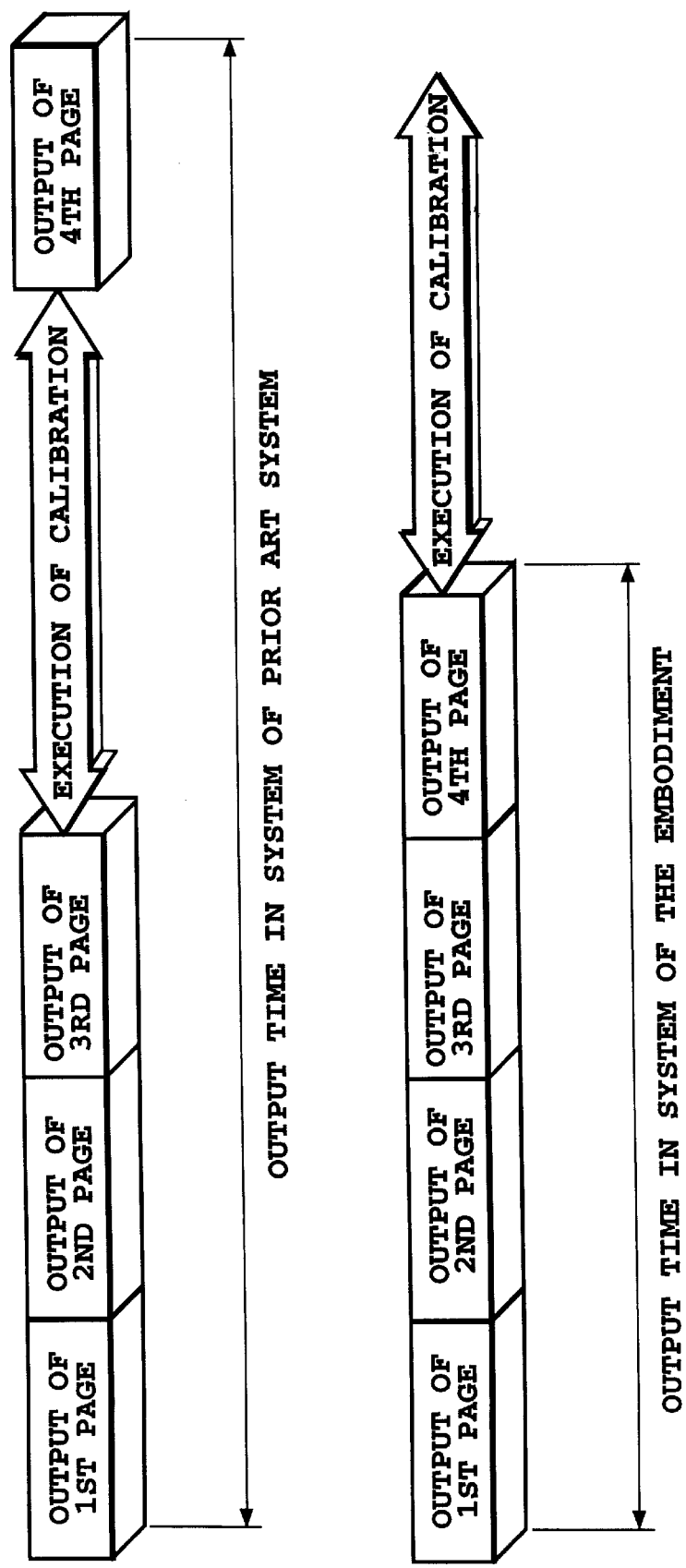
FIG. 13 is a diagram comparing print times taken by a conventional system and the embodiment of the present invention when a calibration request is received during printing operation.

FIG. 13 schematically shows a result of comparison between the embodiments of this invention and a conventional print system in terms of the time It takes to output all the document when the calibration request occurs at the end of the outputting of a third page during the printing of a 4-page document.

In the conventional system, the calibration is executed at the end of the outputting of the third page and, during the execution of calibration, the fourth page is not printed out. Hence, the time required to output the entire document is the sum of output times of individual pages plus the calibration time. In the above embodiment, on the other hand, a control can be made so that the calibration is only executed after all four pages are printed out. With this control, even when the printing is accompanied by calibration, the time required for printing the entire document is only the sum of output times of individual pages.

Regarding the execution of calibration in the embodiments of this invention shown in FIG. 13, an arrangement may be made to execute the calibration forcibly after the calibration request is made but only after the print job is finished. Alternatively, as described in the first embodiment, the calibration may be executed after the print job is finished, depending on the interrupt triggered by the calibration request and on the state of the flag at time of the interrupt.

Other Embodiments

As described above, the present invention can be applied either to a system comprising a plurality of devices (such as host computer, interface device, reader and printer) or to a system comprising a single device (such as copy machine and facsimile).

Further, the scope of this invention includes a system in which an apparatus or computer connected to various devices so as to operate these devices to realize the above-described functions of the embodiments of this invention are supplied with program codes, explained in FIGS. 5 to 8 and 10, to operate these various devices according to programs stored in the apparatus or computer.

In this case, the program codes themselves realize the functions of these embodiments, and therefore the program codes themselves and means for supplying the program codes to the computer, such as storage mediums storing the program codes, constitute the present invention.

The storage mediums for storing such program codes may include, for example, floppy disks, hard disks, optical disks, magnetooptical disks, CD-ROMs, magnetic tapes, non-volatile memory cards and ROMs.

The program codes fall in the scope of this invention not only when the functions of the embodiments of the invention are realized by the program codes as they are executed by the computer, but also when these functions are realized by the program codes in cooperation with the OS (operating system) or application software running on the computer.

Further, the program codes are also within the scope of this invention when the functions of the embodiments are realized by the CPU equipped in a function expansion board or function expansion unit as the CPU executes part or all of its assigned processing according to the instructions of the program codes that are stored in a memory mounted on the computer function expansion board or in a memory mounted on the function expansion unit connected to the computer.

According to the embodiments of the present invention described above, print control data is made include data denoting that the printing apparatus is permitted or prohibited to execute the calibration when the print data and the print control data are transferred from the information processing apparatus to the printing apparatus. Then, the printing apparatus can performs controlling to prevent at least the operations for getting calibration information, such as printing and reading operation of a patch, from being executed when the print control data denotes prohibition of execution of the calibration.

As a result, it is possible to prevent the degradation of throughput which would otherwise be caused by the execution of unnecessary calibration and to deal flexibly with user requirements.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printing control method for a printing system including an information processing apparatus which performs processing for printing and a printing apparatus which includes a print unit for performing printing based on print data from the information processing apparatus and a calibration unit for generating calibration information at Predetermined timing, said printing control method comprising the steps of:

sending from the information processing apparatus to the printing apparatus, together with the print data, print control data denoting whether calibration is allowed to be executed or prohibited from being executed; and in the printing apparatus, controlling the execution or stopping generation of the calibration information by the calibration unit according to content of the print control data.

2. A printing control method as claimed in claim 1, further comprising the step of:

in the information processing apparatus, setting the print control data denoting whether calibration is allowed to be executed or prohibited from being executed.

3. A printing control method as claimed in claim 2, wherein said step of sending the print control data includes setting the print control data based on an input from a user the system.

4. A printing control method as claimed in claim 2, wherein the information processing apparatus has temporary storage, for temporarily storing the print data in a form of intermediate data different from a form of the print data supplied to the printing apparatus, and said step of setting the print control data includes checking whether data to be printed in color is included in the print data stored in the temporary storage and, if not, sets the print control data in a way to prohibit the calibration from being executed.

5. A printing control method as claimed in claim 2, wherein when said step of controlling the execution or stopping execution stops the execution of obtaining the calibration information, said step of controlling further includes performing printing based on the print data sent together with the print control data.

6. A printing control method as claimed in claim 2, wherein when said step of controlling the execution or stopping execution stops the execution of obtaining the calibration information, said method further comprises a step of, in the information processing apparatus, informing an operator that the printing apparatus has issued a request for obtaining the calibration information.

7. A printing control method as claimed in claim 5, wherein when said step of controlling the execution or stopping execution stops the execution of obtaining the calibration information, said step further includes performing printing based on the print data and then performs control for getting the calibration information.

8. A printing system including an information processing apparatus which performs processing for printing and a printing apparatus which includes a print unit for performing printing based on print data from the information processing apparatus and a calibration unit for generating calibration information at predetermined timing, said system comprising:

a sending unit, arranged to send from the information processing apparatus to the printing apparatus, together with the print data, print control data denoting whether calibration is allowed to be executed or prohibited from being executed; and a controller arranged to, in the printing apparatus, control the execution or stop generation of the calibration information by the calibration unit according to content of the print control data.

9. A printing system as claimed in claim 8, further comprising:

a setting unit arranged to, in the information processing apparatus, set the print control data denoting whether calibration is allowed to be executed or prohibited from being executed.

10. A printing system as claimed in claim 9, wherein said sending unit sets the print control data based on an input from a user the system.

11. A printing system as claimed in claim 9, wherein the information processing apparatus has temporary storage, for temporarily storing the print data in a form of intermediate data different from a form of the print data supplied to the printing apparatus, and said setting unit checks whether data to be printed in color is included in the print data stored in the means and, if not, sets the print control data in a way to prohibit the calibration from being executed.

12. A printing system as claimed in claim 9, wherein when said controller stops the execution of obtaining the calibration information, and said controller further performs printing based on the print data sent together with the print control data.

13. A printing system as claimed in claim 9, wherein when said controller stops the execution of obtaining the calibration information, and said system further comprises, in the information processing apparatus, an informing unit arranged to inform an operator that the printing apparatus has issued a request for obtaining the calibration information.

14. A printing system as claimed in claim 12, wherein when said controller stops the execution of obtaining the calibration information, and said controller further performs printing based on the print data and then performs control for getting the calibration information.

15. A storage medium storing a printing control processing program which is adapted to be readable by an information processing apparatus and is for a printing system including the information processing apparatus which performs processing for printing and a printing apparatus which includes a print unit for performing printing based on print data from the information processing apparatus and a calibration unit for generating calibration information at predetermined timing, said control processing program comprising the steps of:

sending from the information processing apparatus to the printing apparatus, together with the print data, print control data denoting whether calibration is allowed to be executed or prohibited from being executed; and in the printing apparatus, controlling the execution or stopping generation of the calibration information by the calibration unit according to content of the print control data.

* * * * *

UNITED STATES PATENT AND TRADEMARK OFFICE
CERTIFICATE OF CORRECTION

PATENT NO.    : 6,280,105 B1
DATED         : August 28, 2001
INVENTOR(S)   : Mitsunori Iida It is certified that error appears in the above-identified patent and that said Letters Patent is hereby corrected as shown below:

Column 2,
Line 3, "printer," should read -- printer. --.
Line 38, "prevent" should read -- prevents --.
Line 46, "performing" should read -- performs --.
Line 48, "calibrate means" should read -- calibration --.
Line 61, "controlling" should read -- controls --.
Line 62, "performing" should read -- performs --.
Line 64, "calibrate means" should read -- calibration --.

Column 3,
Line 8, "performing" should read -- performs --.
Lines 10-11, "calibrate means" should read -- calibration --.
Line 23, "is made include" should read -- includes --.
Line 27, "can" should be deleted.

Column 5,
Line 17, "is" should read -- be --.
Line 27, "More over," should read -- Moreover, --.

Column 8,
Line 26, "execution," should read -- executed, --.
Lines 51-52, "whatever the user next setting" should read -- at whatever the next user setting is --.

Column 10,
Line 38, "It" should read -- it --.
Line 60, "interrupt" should read -- interruption --.
Line 61, "at" should read -- at the --.
Line 62, "interrupt." should read -- interruption. --.

Column 11,
Line 34, "is made include" should read -- includes --.
Line 39, "can" should be deleted.
Line 63, "Prede-" should read -- prede --.

UNITED STATES PATENT AND TRADEMARK OFFICE
CERTIFICATE OF CORRECTION

PATENT NO. : 6,280,105 B1
DATED : August 28, 2001
INVENTOR(S) : Mitsunori Iida

It is certified that error appears in the above-identified patent and that said Letters Patent is hereby corrected as shown below:

Column 12,
Line 14, "the" should read -- of the --.
Line 67, "the" should read -- of the --.

Column 13,
Line 11, "and" should be deleted.
Line 16, "and" should be deleted.
Line 23, "and" should be deleted.

Signed and Sealed this

Second Day of April, 2002

Attest:

JAMES E. ROGAN
Attesting Officer    Director of the United States Patent and Trademark Office